(12) United States Patent
Oikawa et al.

(10) Patent No.: US 9,209,719 B2
(45) Date of Patent: Dec. 8, 2015

(54) LOAD DRIVING DEVICE AND INVERTED MOVABLE BODY EQUIPPED WITH SAME

(75) Inventors: Susumu Oikawa, Yokohama (JP); Akio Kawahara, Toyama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 85 days.

(21) Appl. No.: 13/877,765

(22) PCT Filed: Oct. 5, 2010

(86) PCT No.: PCT/JP2010/005967
§ 371 (c)(1),
(2), (4) Date: Apr. 4, 2013

(87) PCT Pub. No.: WO2012/046271
PCT Pub. Date: Apr. 12, 2012

(65) Prior Publication Data
US 2013/0187576 A1    Jul. 25, 2013

(51) Int. Cl.
*H02P 3/14* (2006.01)
*H02P 3/18* (2006.01)
*B60L 7/02* (2006.01)
*B60L 7/10* (2006.01)

(52) U.S. Cl.
CPC ... *H02P 3/14* (2013.01); *B60L 7/02* (2013.01); *B60L 7/10* (2013.01); *B60L 2200/16* (2013.01)

(58) Field of Classification Search
None
See application file for complete search history.

(56) References Cited

U.S. PATENT DOCUMENTS

| 5,446,365 A | 8/1995 | Omura et al. |
| 6,430,482 B1 | 8/2002 | Wakashiro et al. |
| 8,041,456 B1 * | 10/2011 | Blackwell et al. ............ 700/245 |
| 2005/0092533 A1 | 5/2005 | Ishii |
| 2009/0295224 A1 | 12/2009 | Kobayashi et al. |
| 2010/0116570 A1 * | 5/2010 | Sugawara et al. ............ 180/65.1 |

FOREIGN PATENT DOCUMENTS

| JP | 05-328533 A | 12/1993 |
| JP | 08-154304 A | 6/1996 |
| JP | 2001-112111 A | 4/2001 |
| JP | 2005-045851 A | 2/2005 |
| JP | 2005-094858 A | 4/2005 |
| JP | 2005-130670 A | 5/2005 |
| JP | 2009-290920 A | 12/2009 |

* cited by examiner

*Primary Examiner* — Eduardo Colon Santana
*Assistant Examiner* — Cortez Cook
(74) *Attorney, Agent, or Firm* — Kenyon & Kenyon LLP (57) ABSTRACT

Provided is a load driving device capable of efficiently recovering and using regenerative power and an inverted type movable body equipped with same. The load driving device includes a battery that supplies power to a load when driving the load, and is charged with a part of regenerative power when the regenerative power equal to or higher than a first reference value is generated by the load. The load driving device also includes an internal circuit that consumes at least a part of regenerative power when the regenerative power is generated by the load.

8 Claims, 4 Drawing Sheets

LOAD DRIVING DEVICE AND INVERTED MOVABLE BODY EQUIPPED WITH SAME

This is a 371 national phase application of PCT/JP2010/005967 filed 5 Oct. 2010, the contents of which are incorporated herein by reference.

TECHNICAL FIELD

The present invention relates to a load driving device and an inverted movable body equipped with same.

BACKGROUND ART

In the field of electric vehicles, a technique called regenerative charging that charges a battery by recovering regenerative power generated when braking a motor (load) is known. Use of this technique reduces battery consumption. In this technique, when driving the motor, a power supply path on a discharge circuit side is selected by a switching means, and power is supplied from the battery to the load. On the other hand, when regenerative power is generated by the motor, the power supply path is switched from the discharge circuit side to a charge circuit side by the switching means, and the battery is charged with the regenerative power. In this manner, the power supply path between the battery and the motor is switched by the switching means.

In a typical electric two-wheel vehicle and electric four-wheel vehicle, a throttle is operated for acceleration and a brake is operated for deceleration, and the switching is relatively slow and smooth. Therefore, when applying the known technique of regenerative charging to those electric vehicles, the power supply path between the battery and the motor is actively switched, triggered by the operation of the throttle or the brake, and the battery charging with the regenerative power is performed without waste.

On the other hand, an inverted two-wheel vehicle with two coaxially-mounted wheels that is controlled by the inverted pendulum theory needs to always maintain balance using two wheels. Thus, when applying the known technique of regenerative charging to the inverted two-wheel vehicle, drive mode in which the battery drives the motor and regeneration mode in which regenerative power is generated by the motor are switched in very short periods. Therefore, with the known technique of regenerative charging, the power supply path cannot be switched in response to high-speed charging and discharging of the inverted two-wheel vehicle. Accordingly, the known inverted two-wheel vehicle has not been able to charge a battery by efficiently recovering regenerative power.

Figure 4:
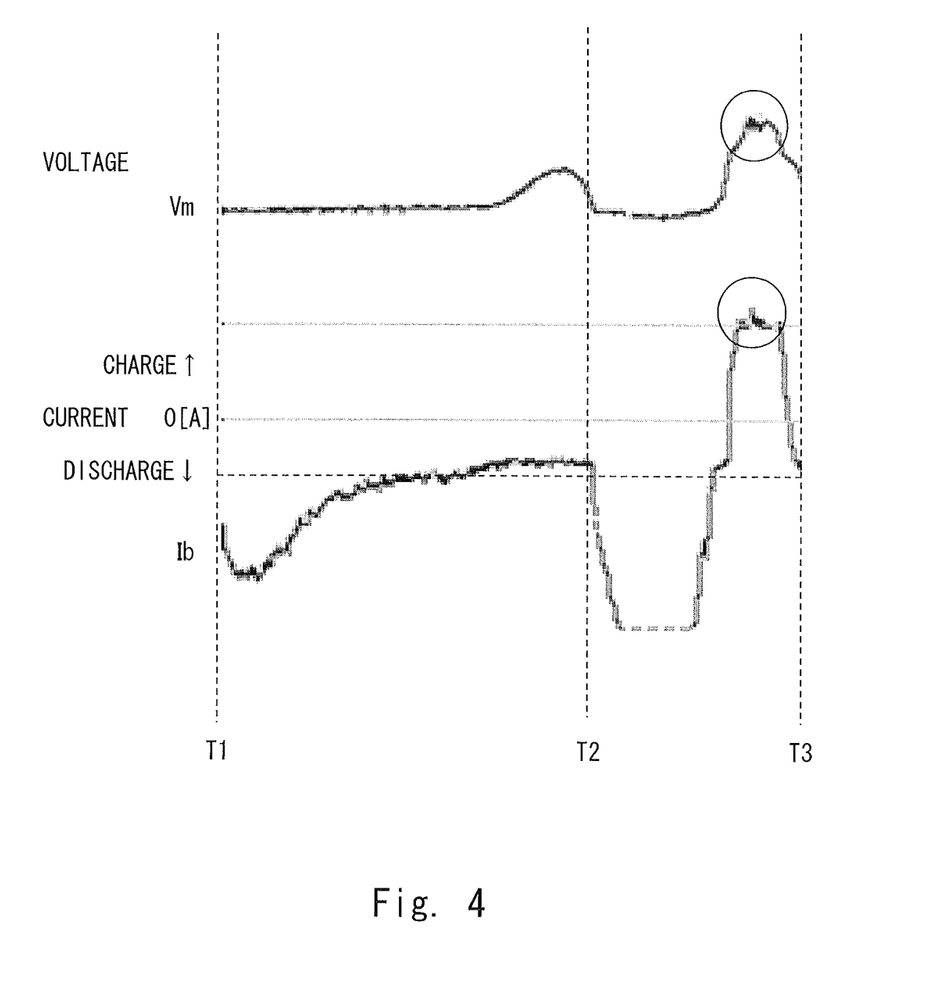
FIG. 4 is a timing chart showing a change in voltage Vm and current Ib.

A control device that charges a battery with regenerative power and does not include a switching means for switching a power supply path between the battery and a motor is disclosed in Patent Literature 1 (cf. FIG. 4 of Patent Literature 1). Because the control device does not include the switching means for switching the power supply path between the battery and the motor, the above-described problem does not occur.

CITATION LIST

Patent Literature

PTL 1: Japanese Patent No. 3226599

SUMMARY OF INVENTION

Technical Problem

However, in the control device (load driving device) disclosed in Patent Literature 1, when the battery reaches its full charge, extra regenerative power is released as heat energy using a discharge resistor. Thus, the load driving device according to related art has a problem of not being able to efficiently recover and use regenerative power.

The present invention has been accomplished to solve the above problem and a primary object of the present invention is thus to provide a load driving device capable of efficiently recovering and using regenerative power.

Solution to Problem

A load driving device according to the present invention includes a battery that supplies power to a load when driving the load and is charged with a part of regenerative power when the regenerative power equal to or higher than a first reference value is generated by the load, and an internal circuit that consumes at least a part of regenerative power when the regenerative power is generated by the load. It is thereby possible to efficiently recover and use regenerative power.

It is preferred that the internal circuit is connected in parallel with the battery with respect to the load.

It is preferred that the internal circuit is a control circuit that controls charging and discharging of the battery.

It is preferred that the load driving device further includes a resistor element that is connected in parallel with the battery with respect to the load, and a switch that is connected in series with the resistor element and controlled to turn on and off in accordance with the regenerative power.

It is preferred that the switch turns on when the regenerative power equal to or higher than a second reference value being higher than the first reference value is generated by the load.

It is preferred that charging of the battery with the regenerative power is limited when the switch is on.

It is preferred that the load driving device further includes a capacitor that is connected in parallel with the battery with respect to the load.

It is preferred that, when the regenerative power is generated by the load, the battery is charged with current from the capacitor if charge voltage of the capacitor is equal to or higher than a first specified voltage corresponding to the first reference value.

It is preferred that the load driving device further includes a resistor element that is connected in parallel with the battery with respect to the load, and a switch that is connected in series with the resistor element and controlled to turn on and off in accordance with the regenerative power.

It is preferred that, when the regenerative power is generated by the load, the switch turns on if charge voltage of the capacitor is equal to or higher than a second specified voltage corresponding to a second reference value being higher than the first reference value.

It is preferred that charging of the battery with the regenerative power is limited when the switch is on.

An inverted movable body according to the present invention includes the above-described load driving device. It is thereby possible to efficiently recover and use regenerative power.

Advantageous Effects of Invention

According to the present invention, it is possible to provide a load driving device capable of efficiently recovering and using regenerative power and an inverted movable body equipped with the same.

DESCRIPTION OF EMBODIMENTS

Embodiments of the present invention are described hereinafter with reference to the drawings. The drawings are given in simplified form by way of illustration only, and thus are not to be considered as limiting the present invention. The same elements are denoted by the same reference symbols, and the redundant explanation is omitted.

First Embodiment

Figure 1:
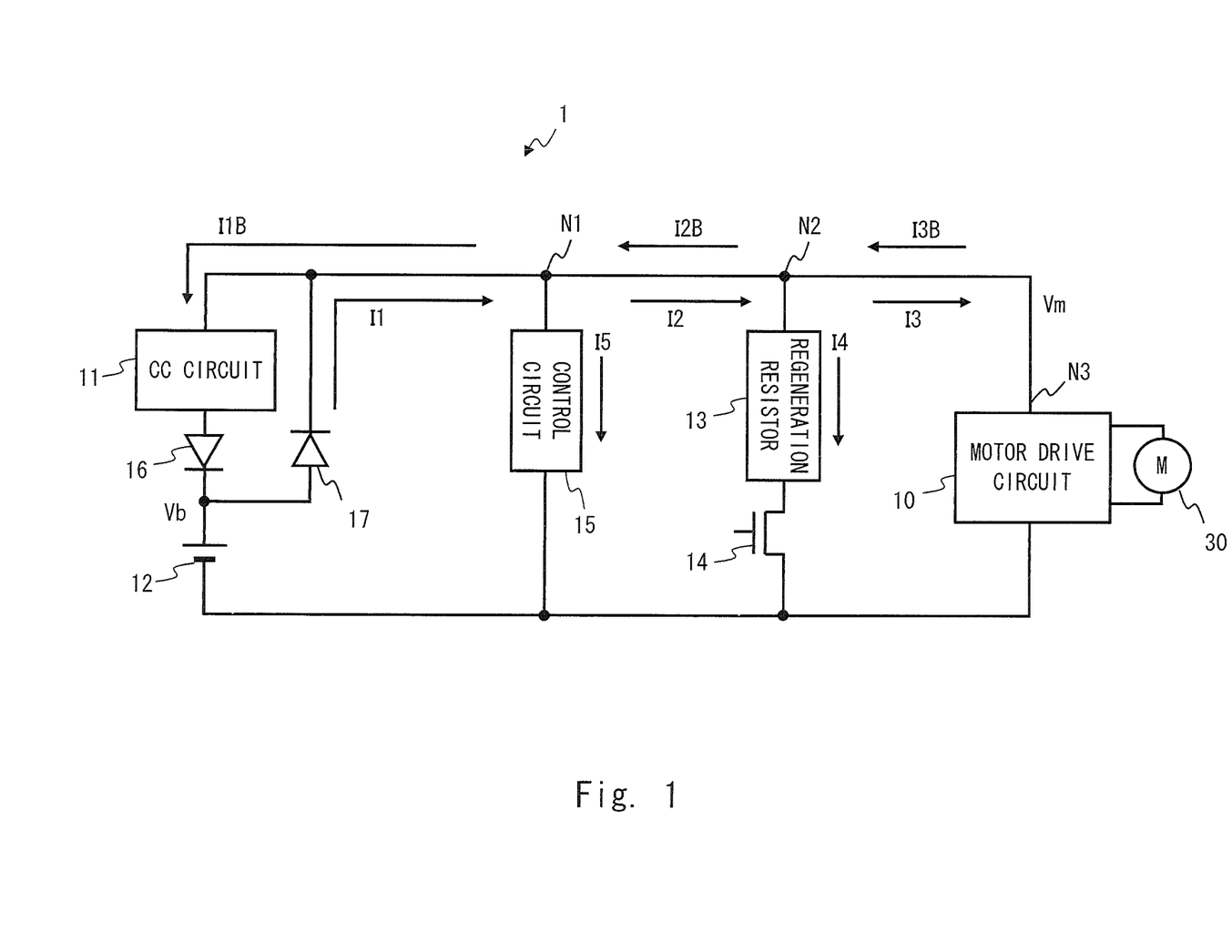
FIG. 1 is a block diagram showing a load driving device according to a first embodiment of the present invention.

FIG. 1 shows a block diagram of a load driving device according to a first embodiment of the present invention. The load driving device 1 shown in FIG. 1 includes a motor drive circuit 10, a CC circuit (constant current circuit) 11, a battery 12, a regeneration resistor (resistor element) 13, a switch 14, a control circuit (internal circuit) 15, a diode 16, and a diode 17. The load driving device 1 shown in FIG. 1 is a device that supplies power to a motor (load) 30 through the motor drive circuit 10 and has a feature that efficiently recovers and uses regenerative power generated by the motor 30. The load driving device 1 is mounted on an inverted movable body such as an inverted two-wheel vehicle, for example. In this embodiment, the case where the load driving device 1 is mounted on an inverted two-wheel vehicle is described by way of illustration. Further, in this embodiment, the case where the battery 12 is a lithium ion battery is described by way of illustration.

First, a circuit configuration of the load driving device 1 is described. The motor drive circuit 10 is connected in series between the both terminals of the battery 12. The motor 30 is connected in series between the output terminal and the input terminal of the motor drive circuit 10. The diode 17 is connected between the positive electrode of the battery 12 and the high-side power terminal of the motor drive circuit 10 in the forward direction from the battery 12. The diode 16 is connected in parallel with the diode 17 in the reverse direction from the battery 12. The CC circuit 11 is connected in series with the diode 16.

Further, the control circuit (internal circuit) 15 is connected in parallel with the battery 12 with respect to the motor 30. Likewise, the regeneration resistor 13 is connected in parallel with the battery 12 with respect to the motor 30. The switch 14 is connected in series with the regeneration resistor 13.

To be more specific, the positive electrode of the battery 12 is connected to the cathode of the diode 16 and the anode of the diode 17. The anode of the diode 16 is connected to the output terminal of the CC circuit 11. The input terminal of the CC circuit 11 and the cathode of the diode 17 are connected to a node N1. The node N1 is further connected to the high-side power terminal of the control circuit 15 and a node N2. The node N2 is further connected to one end of the regeneration resistor 13 and the high-side power terminal (which is referred to hereinafter as a node N3) of the motor drive circuit 10. The other end of the regeneration resistor 13 is connected to one end of the switch 14. The negative electrode of the battery 12 is connected to the low-side power terminal of the control circuit 15, the other end of the switch 14 and the low-side power terminal of the motor drive circuit 10. Note that a voltage at the node N3 is Vm.

The operation of the load driving device 1 is described hereinafter. First, the operation of each block is described briefly, and then the operation of the load driving device 1 is described in detail.

(Motor Drive Circuit 10)

The motor drive circuit 10 is a circuit that supplies current in accordance with power from the battery 12 to the motor 30 when driving the motor 30. The polarity and amount of the current are determined according to the state of acceleration and deceleration of the inverted two-wheel vehicle. Further, when regenerative power is generated by the motor 30, the motor drive circuit 10 raises the voltage Vm in accordance with the regenerative power. When regenerative power is generated, the regenerative power is consumed by the control circuit 15, or the battery 12 is charged with the regenerative power.

(CC Circuit 11)

The CC circuit 11 is a circuit that stabilizes input direct current and outputs constant current. Specifically, the CC circuit 11 generates constant current in accordance with regenerative power and supplies the current to the battery 12 through the diode 16. Further, when the remaining capacity of the battery 12 reaches a set value or when regenerative power generated by the motor 30 is very high, the CC circuit 11 limits the current flowing into the battery 12. Note that, as the CC circuit 11, a linear regulator or a switching regulator such as a DC-DC converter may be used.

(Regeneration Resistor 13, Switch 14)

The regeneration resistor 13 is a circuit that releases regenerative power as heat energy when the switch 14 is on. Note that the switch 14 turns on when the voltage Vm rises and reaches a threshold voltage Vlimit of the switch 14. The voltage Vm further rises when the CC circuit 11 limits the current flowing into the battery 12 as described above. Accordingly, when the remaining capacity of the battery 12 reaches a set value or when regenerative power generated by the motor 30 is very high, the switch 14 turns on, and the regeneration resistor 13 releases extra regenerative power as heat energy.

(Control Circuit 15)

The control circuit 15 is a circuit that controls the operation of the load driving device 1. For example, the control circuit 15 detects the current flowing into the battery 12 and calculates the remaining capacity of the battery 12 based on the detection result and thereby controls whether or not to limit charging of the battery 12. Further, the control circuit 15 detects the voltage Vm and controls on and off of the switch 14 based on the detection result. Furthermore, the control circuit 15 controls the polarity and amount of the current supplied from the motor drive circuit 10 to the motor 30.

(Load Driving Device 1)

The load driving device 1 drives the motor 30 by using the motor drive circuit 10 when accelerating the inverted two-wheel vehicle. At this time, the load driving device 1 supplies power from the battery 12 to the motor drive circuit 10 through the diode 17. The motor drive circuit 10 then supplies current in accordance with the power from the battery 12 to the motor 30.

On the other hand, when the inverted two-wheel vehicle is decelerated, regenerative power is generated by the motor 30. At this time, at least a part of the regenerative power is consumed by the control circuit 15. In other words, at least a part of the regenerative power is used for driving the control circuit 15.

Specifically, when regenerative power is lower than a preset first reference value, the whole of the regenerative power is consumed by the control circuit 15. When regenerative power is equal to or higher than the first reference value, a part of the regenerative power (the regenerative power corresponding to the first reference value) is consumed by the control circuit 15, and the battery 12 is charged with the remaining regenerative power. Further, when regenerative power is equal to or higher than a preset second reference value (second reference value>first reference value), a part of the regenerative power (the regenerative power corresponding to the first reference value) is consumed by the control circuit 15, the battery 12 is charged with another part of the regenerative power, and the remaining regenerative power is released as heat energy by the regeneration resistor 13 because the switch 14 is on. At this time, the current flowing into the battery 12 is limited by the CC circuit 11.

Stated differently, in the case where regenerative power is generated, when the voltage Vm is lower than a preset first specified voltage, the whole of the regenerative power is consumed by the control circuit 15. Note that the first specified voltage is a voltage value corresponding to the first reference value of the regenerative power. When the voltage Vm is equal to or higher than the first specified voltage, a part of the regenerative power (the regenerative power corresponding to the first reference value) is consumed by the control circuit 15, and the battery 12 is charged with the remaining regenerative power. When the voltage Vm is equal to or higher than a preset second specified voltage (second specified voltage>first specified voltage), a part of the regenerative power (the regenerative power corresponding to the first reference value) is consumed by the control circuit 15, the battery 12 is charged with another part of the regenerative power, and the remaining regenerative power is released as heat energy by the regeneration resistor 13 because the switch 14 is on. At this time, the current flowing into the battery 12 is limited by the CC circuit 11. Note that the second specified voltage is a voltage value corresponding to the second reference value of the regenerative power.

(Timing Chart)

Figure 2:
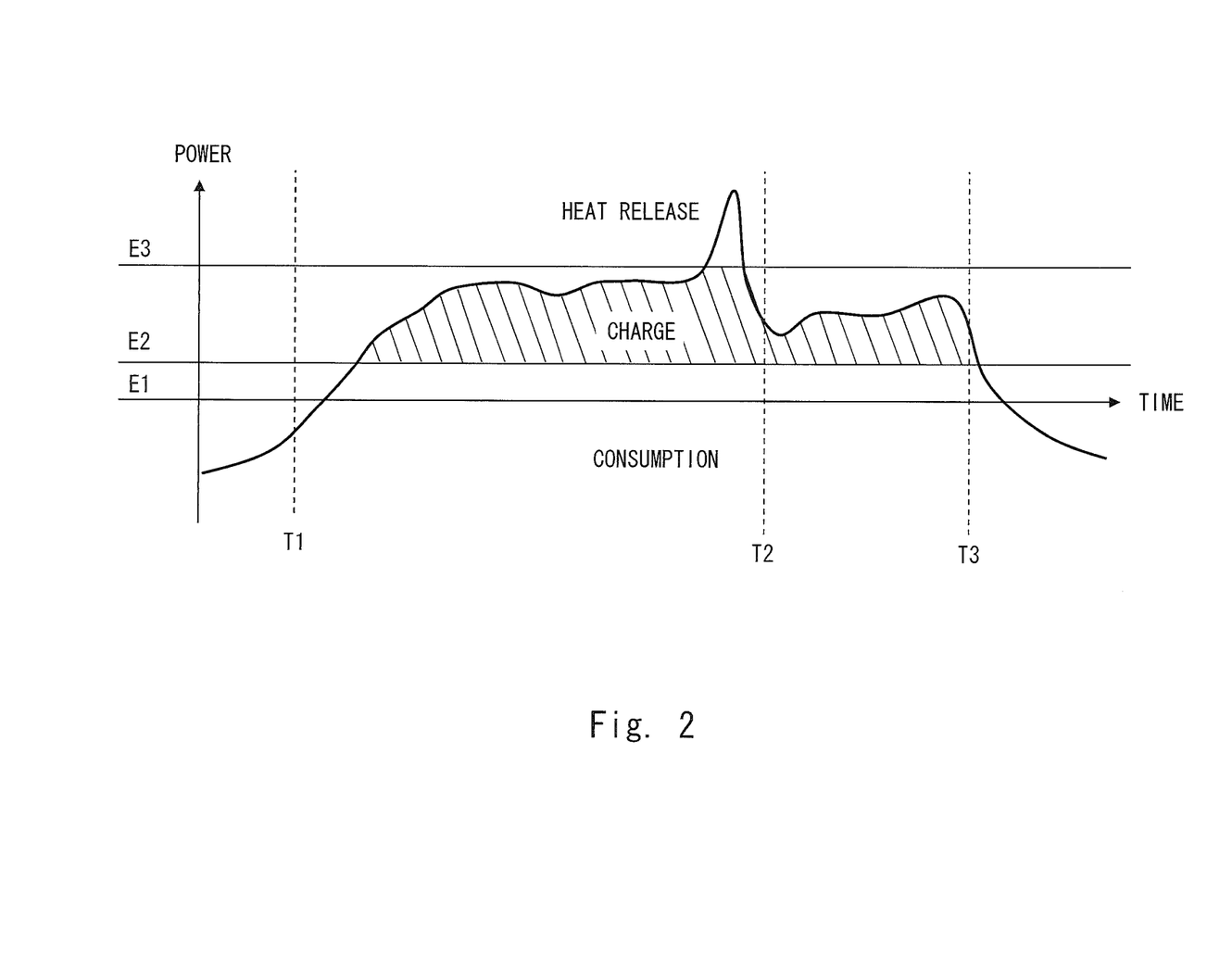
FIG. 2 is a timing chart showing a change in regenerative power.

A change in regenerative power in the case where the inverted two-wheel vehicle equipped with the load driving device 1 operates is described hereinafter with reference to FIG. 2. FIG. 2 is a timing chart showing a change in regenerative power when the inverted two-wheel vehicle is operating. The vertical axis indicates either of power that is discharged from the battery 12 for driving the motor 30 or regenerative power that is generated by the motor 30, and the horizontal axis indicates the traveling time of the inverted two-wheel vehicle.

In the example of FIG. 2, the inverted two-wheel vehicle travels on a flatland until time T1, starts downhill at time T1, and travels downhill from time T1 to time T3. Then, the downhill slope ends at time T3, and the inverted two-wheel vehicle travels on a flatland after that. Note that the inverted two-wheel vehicle decelerates sharply at time T2 but keeps traveling without coming to a stop.

When power is lower than E1 such as before time T1 and after time T3, the power indicates power that is discharged from the battery 12 for driving the motor 30. When power is equal to or higher than E1 such as from time T1 to time T3, the power indicates regenerative power that is generated by the motor 30. Note that, although E2 is linear in FIG. 2 because the case where power consumption of the control circuit 15 is substantially constant is shown by way of illustration, E2 is curved in the case where power consumption of the control circuit 15 varies.

When the generated regenerative power is lower than E2 (first reference value), the whole of the regenerative power is consumed by the control circuit 15. Specifically, the control circuit 15 is driven by the regenerative power and the power from the battery 12 that makes up a shortfall in power.

When the generated regenerative power is equal to or higher than E2 and lower than E3 (second reference value), the regenerative power corresponding to the power E2-E1 is consumed by the control circuit 15, and the battery 12 is charged with the remaining regenerative power.

Further, when the generated regenerative power is equal to or higher than E3, the regenerative power corresponding to the power E2-E1 is consumed by the control circuit 15, the battery 12 is charged with another part of the regenerative power, and the remaining regenerative power is released as heat energy by the regeneration resistor 13 because the switch 14 is on. At this time, the current flowing into the battery 12 is limited by the CC circuit 11. Note that the switch 14 turns on under condition that the voltage Vm reaches the threshold voltage Vlimit of the switch 14 in response to that the regenerative power reaches E3. The switch 14 is controlled to turn on when the regenerative power exceeds the sum of the power that is consumed by the control circuit 15 and the power that can be charged in the battery 12.

The diagonally shaded area between E2 and E3 indicates the amount of electric power that can be charged in the battery 12. E3 is set in consideration of the capacity of the battery 12, the allowable charging speed of the battery 12, the estimated angle of a downhill slope and the like, and a control voltage for controlling on and off of the switch 14 is set in accordance therewith.

The operation of the load driving device 1 in the case where the regenerative power varies as shown in FIG. 2 is described hereinafter in further detail with reference to FIGS. 1 and 2. Note that the output voltage of the battery 12 is Vb, and the power generated by the motor 30 is E. Further, as shown in FIG. 1, the current that flows from the battery 12 to the node N1 through the diode 17 is I1. The current that flows from the node N1 to the node N2 is I2. The current that flows from the node N2 to the node N3 is I3. The current that flows to the regeneration resistor 13 is I4. The current that flows to the control circuit 15 is I5. The current that flows from the node N3 to the node N2 is I3B. The current that flows from the node N2 to the node N1 is I2B. The current that flows from the node N1 to the CC circuit 11 is I1B.

In the case where the inverted two-wheel vehicle travels on a flatland (or uphill slope) such as before time T1 and after time T3, that is when the load driving device 1 is in normal driving state (E<E1), the values of the voltage are Vb>Vm, and therefore current flows in the direction of I1. At this time, the switch 14 is off, and the values of the current are: I4=0, I3=I2 and I1=I3+I5. Thus, the control circuit 15 and the motor drive circuit 10 are both driven by the power from the battery 12.

In the case where the inverted two-wheel vehicle travels on a downhill slope such as from time T1 to time T3, that is when the load driving device 1 decelerates the motor 30 (E>E1), the values of the voltage are Vb<Vm, and therefore current flows in the direction of I3B. In this case, when the regenerative power is lower than E2 (E2>E>E1), the control circuit 15 is driven by the regenerative power and the power from the battery 12 that makes up a shortfall in power. At this time, the switch 14 is off, and the values of the current are: I2B=I3B and I5=I1+I3B. Because I5 is substantially constant, even when I3B changes, I1 changes so as to chancel it out.

Further, when the regenerative power becomes higher than E2 (E3>E>E2), the values of the current are: I5<I3B, and therefore the CC circuit 11 starts supplying constant current to the battery 12, and the battery 12 begins to be charged. Thus, the regenerative power corresponding to the power E2-E1 is consumed by the control circuit 15, and the battery 12 is charged with the remaining regenerative power. At this time, the switch 14 is off, and the values of the current are: I2B=I3B and I3B=I1B+I5.

In the case where the inverted two-wheel vehicle travels on a sharper downhill slope such as just before time T2, that is when the load driving device 1 decelerates the motor 30 sharply (E>E3), instantaneously high power is generated by the motor 30. At this time, the CC circuit 11 limits the current flowing into the battery 12. The CC circuit 11 thereby prevents overcurrent from flowing into the battery 12.

When the current flowing into the battery 12 is limited by the CC circuit 11, the voltage Vm further rises and reaches the voltage Vlimit. The switch 14 thereby turns on, and the current I4 starts flowing into the regeneration resistor 13. Thus, the regenerative power corresponding to the current I4 is released as heat energy by the regeneration resistor 13. At this time, the values of the current are: I3B=I4+I5+I1B. Because the resistance value of the regeneration resistor 13 is very low, the voltage Vm drops abruptly and becomes lower than the voltage Vlimit. The switch 14 thereby turns off, and the current I4 stops flowing into the regeneration resistor 13. After the switch 14 turns off, the voltage Vm rises again and reaches the voltage Vlimit. In this manner, The switch 14 repeatedly turns on and off, and the voltage Vm eventually converges at about the voltage Vlimit. The motor drive circuit 10 is thereby protected from overvoltage due to the rise of the voltage Vm.

Note that, when the rate of switching between on and off of the switch 14 is slow, overvoltage or overcurrent is supplied to the motor drive circuit 10, which hinders accurate inversion control. It is thus preferred that the switching between on and off of the switch 14 is controlled in a sufficiently short period.

As described above, when regenerative power is generated by the motor 30, the load driving device 1 lets the internal circuit such as the control circuit 15 consume at least a part of the regenerative power rather than charging the battery 12 with the regenerative power. Then, when the regenerative power cannot be fully consumed by charging of the battery 12 and consumption by the internal circuit, the load driving device 1 releases the remaining regenerative power as heat energy by the regeneration resistor 13. In this manner, the load driving device 1 uses regenerative power not only for charging of the battery 12 but also for driving of the internal circuit, which is different from the related art, thereby efficiently recovering and using the regenerative power.

Further, when regenerative power is generated by the motor 30, the load driving device 1 lets the internal circuit consume at least a part of the regenerative power directly without through the battery 12. The load driving device 1 can thereby efficiently recover and use the regenerative power without wastefully consuming the regenerative power by charging and discharging of the battery 12.

Figure 3:
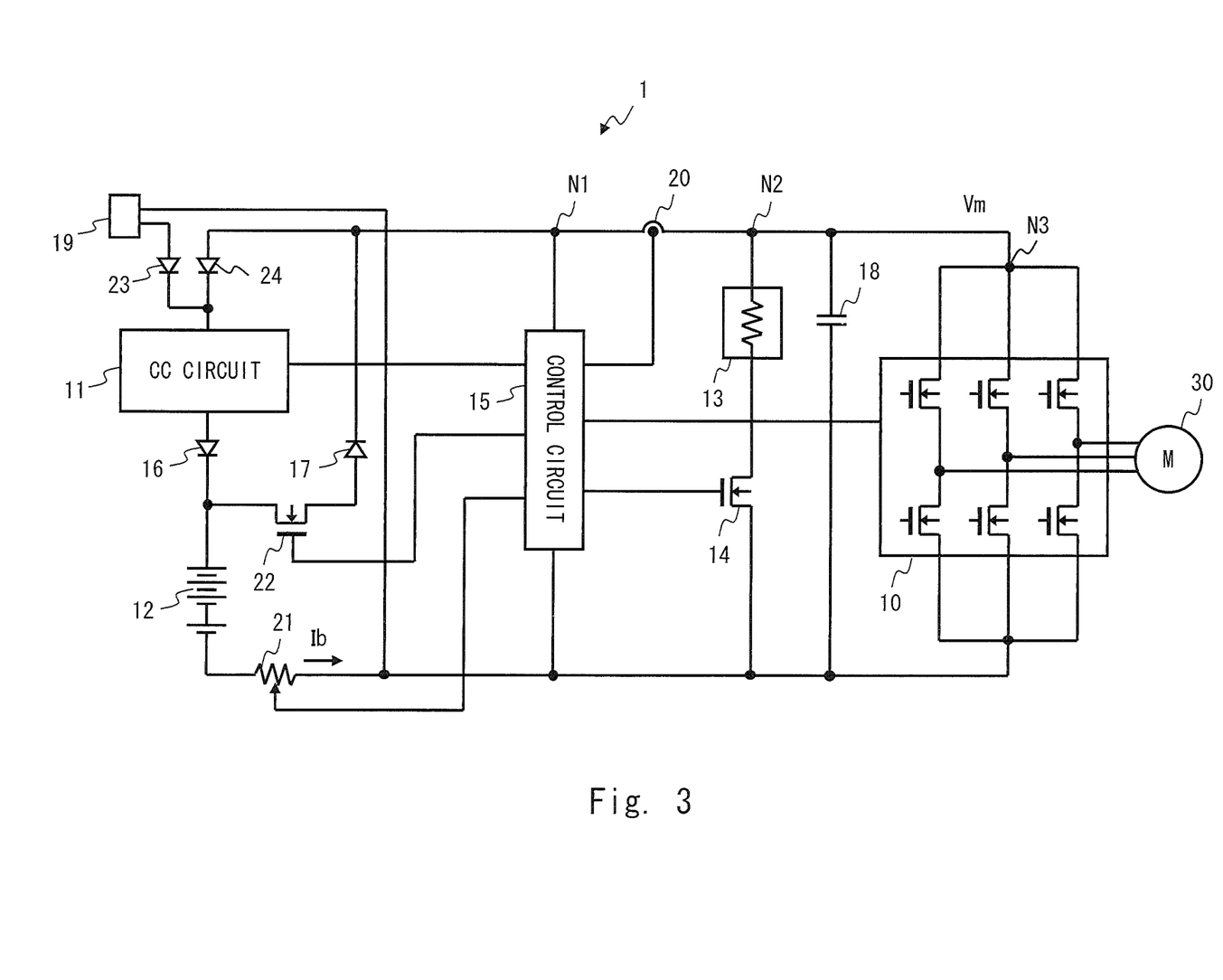
FIG. 3 is a block diagram showing a load driving device according to the first embodiment of the present invention.

FIG. 3 is a block diagram showing the load driving device 1 in FIG. 1 in more detail. The load driving device 1 shown in FIG. 3 includes a capacitor 18, a power supply connector 19, a voltage detection circuit 20, a current detection circuit 21, a switch 22, a diode 23 and a diode 24 in addition to the motor drive circuit 10, the CC circuit 11, the battery 12, the regeneration resistor 13, the switch 14, the control circuit 15, the diode 16 and the diode 17, and it is a block diagram showing the circuit configuration that is closer to real design.

The capacitor 18 acts to smooth the voltage Vm. The capacitor 18 is connected in parallel with the battery 12 with respect to the motor 30.

The positive electrode terminal of the power supply connector 19 is connected to the input terminal of the CC circuit 11 through the diode 23, and the negative electrode terminal of the power supply connector 19 is connected to the negative electrode of the battery 12. The diode 24 is connected between the node N1 and the CC circuit 11. The switch 22 is connected in series between the diode 17 and the battery 12. On and off of the switch 22 are controlled by a power supply switch and the control circuit 15.

When the power supply connector 19 is connected to an external charger (not shown), the battery 12 is charged with power that is supplied from the external charger through the power supply connector 19. During charging of the battery 12, the switch 22 is controlled to be off by the control circuit 15, so that the motor drive circuit 10 does not perform driving. When the power supply connector 19 is disconnected from the external charger, that is when charging of the battery 12 is completed, the switch 22 is controlled to be on, and thereby the load driving device 1 can perform normal operation.

The voltage detection circuit 20 is connected between the node N1 and the node N2 and detects the voltage Vm. The control circuit 15 controls on and off of the switch 14 based on the detection result by the voltage detection circuit 20. For example, the control circuit 15 controls the switch 14 to turn on when the voltage detection circuit 20 detects that the voltage Vm reaches the voltage Vlimit.

The current detection circuit 21 is connected on the negative electrode side of the battery 12 and detects the current Ib flowing into the battery 12. The control circuit 15 adds up the values of the current Ib that is detected at regular intervals and calculates the remaining capacity of the battery 12 and thereby controls whether or not to limit charging of the battery 12. For example, the control circuit 15 controls the CC circuit 11 to limit the current flowing into the battery 12 when it calculates that the remaining capacity of the battery 12 is 80%. Note that the current detection circuit 21 is connected on the negative electrode side of the battery 12 so that it can be placed near the battery 12 and detect the current highly accurately. Further, in order to grasp the remaining capacity of the battery 12 correctly, it is preferred that the current detection by the current detection circuit 21 is performed in a sufficiently short period. Alternatively, it is preferred to use a highly accurate measurement method such as Coulomb counter.

The control circuit 15 further controls the polarity and amount of current that is supplied from the motor drive circuit 10 to the motor 30. The other circuit configuration and operation are described earlier in the load driving device 1 shown in FIG. 1, and redundant description thereof is omitted.

A change in regenerative power in the case where the inverted two-wheel vehicle equipped with the load driving device 1 shown in FIG. 3 operates is described hereinafter with reference to FIG. 4. FIG. 4 is a timing chart showing a change in the voltage Vm and the current Ib when the inverted two-wheel vehicle is operating. The upper part of FIG. 4 shows a change in the voltage Vm that is detected by the voltage detection circuit 20, and the lower part of FIG. 4 shows a change in the current Ib that is detected by the current detection circuit 21. The vertical axis indicates the voltage value of the voltage Vm in the upper part and indicates the current value of the current Ib in the lower part, and the horizontal axis indicates the traveling time of the inverted two-wheel vehicle. Note that, when the current Ib is a positive value, the battery 12 is charged by regenerative power, and when the current Ib is a negative value, the battery 12 is discharged to drive the motor 30.

In the example of FIG. 4, the inverted two-wheel vehicle accelerates moderately from time T1 to time T2, then decelerates and stops. After that, the inverted two-wheel vehicle accelerates sharply from time T2 to time T3, then decelerates sharply and stops.

Immediately after time T1, the inverted two-wheel vehicle accelerates, and therefore the battery 12 is discharged. Immediately before time T1, the inverted two-wheel vehicle decelerates and stops, and therefore regenerative power is generated by the motor 30, and the voltage Vm rises. At this time, the regenerative power is consumed by the control circuit 15, though it has not yet led to the point where the battery 12 is charged with the regenerative power. This is obvious from that the discharge current of the battery 12 decreases. The power consumption is thereby reduced.

Immediately after time T2, the inverted two-wheel vehicle accelerates sharply, and therefore the battery 12 is discharged rapidly. The current Ib at this time is not shown because it goes beyond the measuring range. Immediately before time T3, the inverted two-wheel vehicle decelerates sharply and stops, and therefore regenerative power is generated by the motor 30, and the voltage Vm rises. At this time, a part of the regenerative power is consumed by the control circuit 15, and the battery 12 is charged with the remaining regenerative power. However, when the regenerative power further increases and exceeds the limit of power that can be charged in the battery 12 per unit time, the CC circuit 11 limits the current flowing into the battery 12. As a result, the voltage Vm further rises and reaches the voltage Vlimit, and therefore the switch 14 turns on. The extra regenerative power is thereby released as heat energy by the regeneration resistor 13. Because the resistance value of the regeneration resistor 13 is very low, the voltage Vm drops abruptly and becomes lower than the voltage Vlimit. The switch 14 thereby turns off again, and the voltage Vm rises again and reaches the voltage Vlimit. In this manner, the switch 14 repeatedly turns on and off, and therefore the voltage Vm and the current Ib vary minutely in the circles shown in FIG. 4.

As described above, when regenerative power is generated by the motor, the load driving device according to this embodiment lets the internal circuit such as the control circuit consume at least a part of the regenerative power rather than charging the battery with the regenerative power. Then, when the regenerative power cannot be fully consumed by charging of the battery and consumption by the internal circuit, the load driving device according to this embodiment releases the remaining regenerative power as heat energy by the regeneration resistor. In this manner, the load driving device according to this embodiment uses regenerative power not only for charging of the battery but also for driving of the internal circuit, which is different from the related art, and it is thereby possible to efficiently recover and use the regenerative power.

Further, when regenerative power is generated by the motor, the load driving device according to this embodiment lets the internal circuit consume at least a part of the regenerative power directly without through the battery. The load driving device according to this embodiment can thereby efficiently recover and use the regenerative power without wastefully consuming the regenerative power by charging and discharging of the battery.

Furthermore, the load driving device according to this embodiment does not have a switching means for switching the power supply path between the battery and the motor. Therefore, even when drive mode in which the battery drives the motor and regeneration mode in which regenerative power is generated by the motor are switched in very short periods, the load driving device according to this embodiment can operate accurately in response to the switching.

Note that the present invention is not restricted to the above-described embodiments, and various changes and modifications may be made without departing from the scope of the invention. Although the case where at least a part of regenerative power is consumed by the control circuit 15 is described as an example in this embodiment, it is not limited thereto. The circuit configuration may be altered so that at least a part of regenerative power is consumed by another internal circuit which is not shown, instead of the control circuit 15. Further, the circuit configuration may be altered so that a plurality of internal circuits are connected in parallel with the battery with respect to the load.

Further, although the case where charging of the battery 12 is limited when the remaining capacity of the battery 12 reaches 80% is described as an example in this embodiment, it is not limited thereto. The remaining capacity of the battery 12 as a threshold as to whether charging of the battery 12 is limited or not may be set arbitrarily. Thus, the circuit configuration may be altered so that charging of the battery 12 is limited when the remaining capacity of the battery 12 reaches about 100%. In this case, the load driving device 1 needs to include a CC/CV circuit in place of the CC circuit 11. The CC/CV circuit switches its output from constant current to constant voltage when the remaining capacity of the battery 12 reaches 80%, for example.

Note that, in a lithium ion battery, the battery life is different between the case where charging up to the maximum capacity (the remaining capacity of 100%) is repeated and the case where charging up to the remaining capacity of 80% is repeated, and it is reported that the life is longer in the latter case.

Further, although the case where the battery 12 is a lithium ion battery is described as an example in this embodiment, it is not limited thereto. The circuit configuration may be altered so that the battery 12 is a general rechargeable battery. Note that those batteries including the lithium ion battery store electric power by chemical reaction, and a limit is placed to the reaction rate. Charging those batteries with high voltage and high current in a short time exceeding a specified reaction rate causes breakage or performance degradation of the batteries. Therefore, the current flowing into the battery 12 needs to be controlled by the CC circuit 11.

Further, the design is preferably made so that the switch 14 is on when the load driving device 1 is powered off. Charges are thereby not accumulated in the capacitor 18 during power-off of the load driving device 1, which avoids the possibility of an electric shock due to a direct contact with the load driving device 1. Further, even when the motor 30 rotates by an external force and regenerative power is generated during power-off of the load driving device 1, if the switch 14 is on, the regenerative power is consumed by the regeneration resistor 13. Accordingly the motor drive circuit 10 is protected from overvoltage due to the rise of the voltage Vm.

Furthermore, in the related art, an external charger includes the CC circuit. On the other hand, in the present invention, the load driving device, not the external charger, includes the CC circuit, and therefore the size of the external charger can be reduced. Further, when charging the battery with an external charger, the load driving device according to this embodiment does not need to use the external charger including the CC circuit, and therefore a general commercial power can be used as the external charger.

INDUSTRIAL APPLICABILITY

A load driving device and an inverted movable body quipped with the same according to the present invention are used as a load driving device capable of efficiently recovering and using regenerative power and an inverted movable body equipped with the same.

REFERENCE SIGNS LIST

1 LOAD DRIVING DEVICE
10 MOTOR DRIVE CIRCUIT
11 CC CIRCUIT
12 BATTERY
13 REGENERATION RESISTOR
14 SWITCH
15 CONTROL CIRCUIT
16 DIODE
17 DIODE
18 CAPACITOR
19 POWER SUPPLY CONNECTOR
20 VOLTAGE DETECTION CIRCUIT
21 CURRENT DETECTION CIRCUIT
22 SWITCH
23 DIODE
24 DIODE
30 MOTOR

The invention claimed is:

1. A load driving device mounted on an inverted movable body, comprising:
- a battery that supplies power to a load when driving the load, and is charged with a part of regenerative power when the regenerative power equal to or higher than a first reference value is generated by the load;
- a control circuit that is connected in parallel with the battery with respect to the load and consumes at least a part of regenerative power when the regenerative power is generated by the load;
- a resistor element that is connected in parallel with the battery with respect to the load; and
- a switch that is connected in series with the resistor element and controlled to turn on and off in accordance with the regenerative power, wherein when the regenerative power generated by the load is lower than the first reference value, the whole of the regenerative power is consumed by the control circuit, when the regenerative power generated by the load is equal to or higher than the first reference value and lower than a second reference value which is higher than the first reference value, the regenerative power corresponding to the first reference value is consumed by the control circuit, and the battery is charged with the remaining regenerative power, and when the regenerative power generated by the load is equal to or higher than the second reference value, the regenerative power corresponding to the first reference value is consumed by the control circuit, and the remaining regenerative power is fed to the battery to charge the battery and is released as heat energy by the resistor element.

2. The load driving device according to claim 1, wherein the control circuit controls charging and discharging of the battery.

3. The load driving device according to claim 1, wherein charging of the battery with the regenerative power is limited when the switch is on.

4. The load driving device according to claim 1, further comprising:
a capacitor that is connected in parallel with the battery with respect to the load.

5. The load driving device according to claim 4, wherein, when the regenerative power is generated by the load, the battery is charged with current from the capacitor if charge voltage of the capacitor is equal to or higher than a first specified voltage corresponding to the first reference value.

6. The load driving device according to claim 4, wherein, when the regenerative power is generated by the load, the switch turns on if charge voltage of the capacitor is equal to or higher than a second specified voltage corresponding to a second reference value being higher than the first reference value.

7. The load driving device according to claim 6, wherein charging of the battery with the regenerative power is limited when the switch is on.

8. An inverted movable body comprising a load driving device according to claim 1.

* * * * *